Aug. 15, 1933.　　　　P. H. HUTCHINSON　　　　1,922,093
GAUGE
Filed Oct. 13, 1927

INVENTOR:
PHILIP H. HUTCHINSON,
BY *[signature]*
HIS ATTORNEY.

Patented Aug. 15, 1933

1,922,093

UNITED STATES PATENT OFFICE 1,922,093

GAUGE

Philip H. Hutchinson, Montclair, N. J., assignor to General Motors Corporation, Detroit, Mich., a Corporation of Delaware Application October 13, 1927. Serial No. 226,019

29 Claims. (Cl. 51—165)

This invention relates to gauges and comprises all the features of novelty herein disclosed. An object of the invention is to provide an improved feeler gauge for engaging a round work-piece during grinding or other machining and controlling a series of electric circuits on the machine in accordance with the exact size of the piece. Another object is to provide an improved mounting for a feeler gauge and the work to be gauged or sized such that very accurate gauging or sizing is obtainable by close temperature control and by allowing the gauge to float with the work. Another object is to provide an improved floating gauge for accurately measuring the size of a round work-piece during machining. To these ends and also to improve generally upon devices of the character indicated the invention consists in the various matters hereinafter described and claimed.

When a round work-piece to be machined or ground is supported by a chuck, the piece is apt to be gripped in a slightly eccentric position or be cocked with respect to the axis of the chuck. A feeler gauge in contact with such a piece is affected by the wabbling movement of the work which necessarily results and so gives inaccurate size indications. The work-piece also has much of its surface in contact with or surrounded by chuck parts and the heat produced by machining or grinding cannot all be dissipated. The heat also affects the gauge which measures the piece in its expanded condition and, upon subsequent cooling, the piece is a different size from that inaccurately indicated by the gauge. According to the present invention, the work and the gauge are so supported that temperature variations are substantially eliminated and the errors of inaccurate centering of the work are eliminated by mounting the gauge and the work to float together. The feeler gauge is shown, by way of example, as adapted for gauging the internal diameter of a round work-piece which is being machined on an internal grinding machine but, in its broader aspects, the invention is not necessarily so limited.

In the drawing, Fig. 1 is a front view of a gauge housing with the cover plate and associated parts removed.

Figure 1:
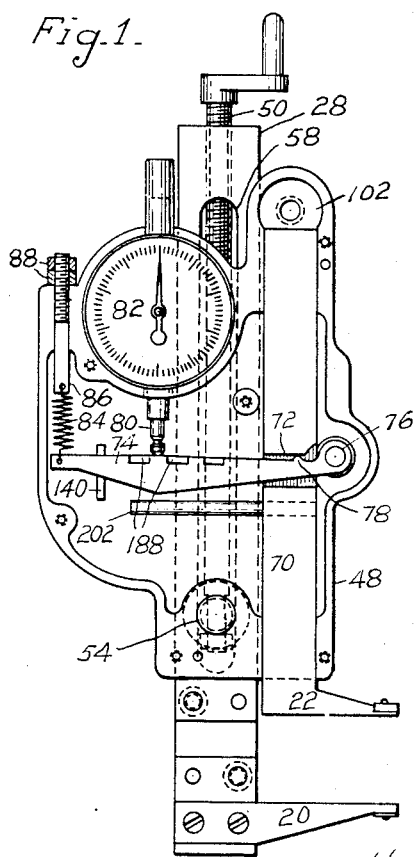
Figure 2:
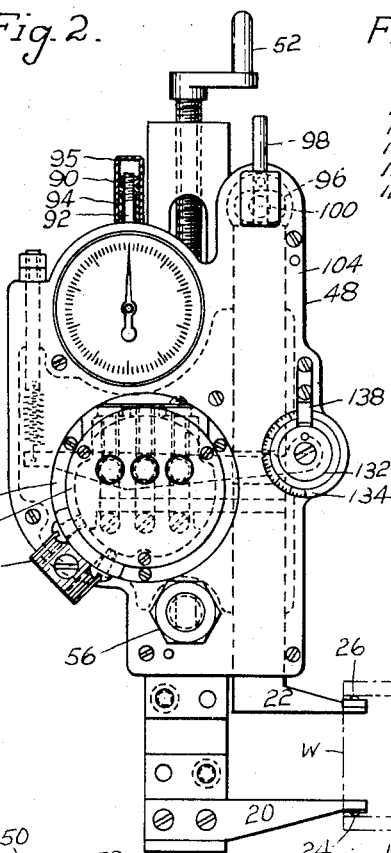
Fig. 2 is a front view of the gauge.
Figure 3:
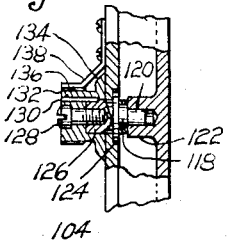
Fig. 3 is a fragmentary sectional view of the mounting and adjusting means for the eccentric fulcrum pin.
Figure 6:
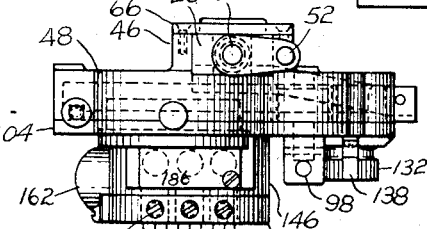
Fig. 6 is a plan view of the gauge housing.
Figure 5:
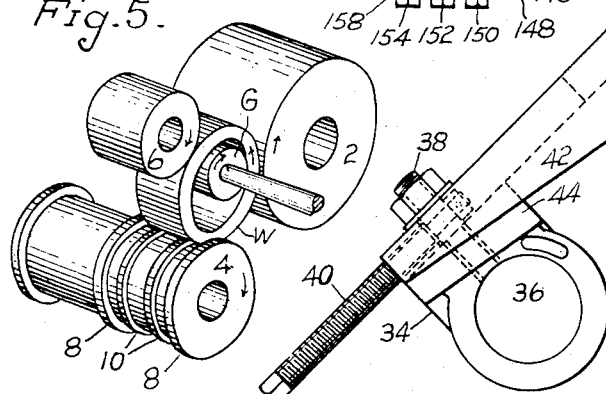
Fig. 5 is a perspective view of the work supporting means.
Figure 4:
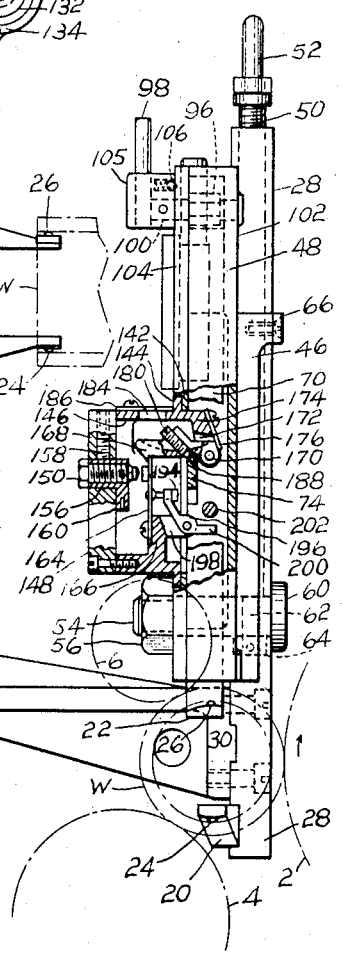
Fig. 4 is a side elevation of the gauge with parts broken away and in section.

The work-piece W, as indicated by the broken lines in Fig. 4, is rotatably supported between wheels 2, 4 and 6 which have a changing line contact with the piece thereby facilitating cooling. One wheel, as 2, is preferably driven at a speed usual to that of a chuck to control the rotation fo the work, the work being pressed against the wheel 2 and against a supporting idler wheel 4 by a third idler wheel 6. The wheel 4 preferably has end flanges 8 to prevent axial movement of the work and supporting rails 10 to facilitate removal of grit. The work is thus open at both ends and all surfaces are completely exposed to access of cooling fluid. A tool, such as a rotary grinding wheel G which preferably reciprocates axially in the bore of the work, is fed radially directly towards that point of the work which is opposite the line of contact of the wheel 2 with the periphery of the work. The wall of the work-piece is thus ground accurately to a uniform thickness between the wheel 2 and the grinding wheel G, the wheel 2 with the aid of pressure idler wheel 6 driving the work in a direction preferably but not necessarily opposed to the movement of the grinding wheel.

The feeler gauge comprises two feeler arms 20 and 22 which enter the open bore of the work from the side opposite the grinding wheel and the lower arm 20 carries a diamond or feeler gauge point 24 which supports the weight of the gauge parts in a floating manner on the inner wall of the work. The upper arm carries a diamond or feeler gauge point 26 which engages a point on the work preferably diametrically opposite the gauge point 24 and the upper feeler arm is movable with respect to the lower arm to measure and indicate the diameter or change in dimension of the work. Both diamonds and all of the gauge parts will float as one while supported by the lower diamond on the inner wall of the work and the effect of high spots or other out of roundness in the outer periphery of the work-piece is neutralized. The lower gauge arm 20 is fastened in a groove at the front of a vertical bracket 28 which is in turn fastened to a face plate 30 on the rear of a bent arm 32 adjustably secured to a block 34 on a rock shaft 36. The bent arm is slotted to receive a square portion on a screw stud 38 projecting from the block, an adjusting screw 40 being threaded in the arm and being rotatably secured to the stud. The bent arm has depending side ribs 42 embracing a central guide rib 44 on the block, the guiding surfaces having a 45° inclination to the vertical on the preferred arrangement so as to enable the diamonds to be located at the ends of a vertical diameter on a work-piece of any selected size. The supporting wheel 4 is adjustable in any suitable way to enable work-pieces of all sizes to make contact with the same line on the wheel 2 or in other words the centers of all work-pieces preferably come at the same level and the diamonds engage analogous points on work-pieces of all sizes. Inasmuch as the gauge and indicator can be initially set by comparison with a master or reference work-piece of known size, the two diamonds need not be precisely in the vertical plane through the center of the work-piece but actual size indications are preferred and can be obtained for different runs of work because of the adjustment provided between the arm 32 and the block 34.

The vertical bracket 28 is embraced by vertical side rails 46 on the rear of a gauge housing or body 48 which is adjustable vertically on the bracket by a screw 50 having a crank handle 52. The housing and the bracket with the supporting arm 32, for example, constitute a floating gauge carrier supported by the work which in turn floats on the wheels. A bolt 54, having a clamping nut 56, passes through the gauge housing 48 and has a squared section in a slot 58 of the vertical bracket with a head 60 outside the slot. The screw 50 is threaded in the upper end of the bracket, traverses the slot, and has a reduced extension 62 rotatably received in the squared portion of the bolt, a collar 64 holding the screw against axial movement with respect to the bolt. The head 60 of the bolt and a strap 66 connecting the side rails 46 retain the housing in adjusted position on the bracket. Upon loosening the clamping nut 56 and turning the crank handle, the housing can be raised or lowered to place the upper movable gauge arm 22 at the desired initial distance from the lower arm to suit the diameter of work.

With the wheel 4 adjustable to support all sizes of work with centers at the same level and with the line of contact of the work with the wheel 2 always at the same place, as is preferred, the larger the work the more the gauge carrier as a whole must be shifted downwardly and to the left in Fig. 4 to place the lower gauge point in contact with the lowest point of the work. The 45° inclination of the guide rib 44 and the adjusting screw 40 provide for this setting. All the gauge parts can be swung up out of the way around the axis afforded by the rock shaft 36.

The upper gauge arm 22 is carried by a vertical slide bar 70 guided in ways on the interior of the gauge housing. The bar has a recess 72 at its front traversed by a control member in the form of a multiplying lever 74 fulcrumed at 76 and having a ridge 78 engaging the upper wall of the recess 72. The lever engages the stem 80 of an indicator having a dial 82, a coil spring 84 attached to the end of the lever pulling it upwardly against the gauge stem as the upward movement of the upper feeler gauge arm permits. The spring is secured to a bolt 86 having nuts 88 by which the tension of the spring can be regulated. The downward movement of the gauge stem is limited by nuts 90 threaded on a screw 92 and engaging the upper end of a sleeve 94 on the gauge housing, a dust cap 95 enclosing the upper end of the screw and the nuts. Since the downward movement of the gauge stem is limited, the gauge need not begin to indicate until the lever 74, in its upward movement, engages the stem, and thus unnecessary wear on the indicator is reduced. The upper gauge arm 22 and its slide bar 70 can be lowered manually, as when putting a work piece into position over the diamonds or resetting certain contact members to be later described, by a cam 96 having an operating handle 98. The cam is arranged to engage the upper end of the slide bar 70 and is mounted in a recess of the gauge housing on a shaft 100 journalled in the rear wall 102 of the gauge housing and in its cover plate 104. The shaft is pinned to a knob 105 having a hole for a spring pressed ball 106 which engages a notch on the cover plate to hold the cam frictionally in its middle position.

The fulcrum for the multiplying lever comprises the eccentric portion 118, a reduced portion 120 journalled in a boss 122 on the housing, a flanged portion 124 fitting a circular recess in the back of the cover plate, and a hub portion 126 which projects through the cover plate where it is secured by a screw 128 and a key pin 130 to a micrometer knob 132. The knob has a bevelled flange or dial 134 which is graduated and the knob is milled or knurled for cooperation with a nib 136 on a bent spring 138 which acts as a ratchet lock to hold the eccentric pin in accurately adjusted position. As will later appear, the eccentric pin gives a very accurate setting of the multiplying lever 74 with respect to the gauge stem and other parts accuated by the lever 74. The lever is guided between the cover plate and a lug 140 on the inside of the gauge housing.

The cover plate 104 has a circular opening with a flanged rim 142 to which a flange 144 on a casting 146 is secured by screws. The front of the casting is closed by a circular block 148 of insulating material carrying a series of contact screws 150, 152 and 154, herein shown as three in number, each threaded in a sleeve 156 which is clamped in the block by a set screw 158. Each sleeve 156 has a terminal portion 160 to which an insulated wire may be attached, the casting having a detachable sleeve like extension 162 at one side through which the insulated wires may be led to their respective circuits. A series of leaf springs 164 are fastened in recesses at the front of a projection 166 in the casting and each spring carries a contact button arranged to engage its corresponding contact screw when the leaf spring, which is normally under tension tending to move it forward, is released under control of the gauge. The springs are electrically grounded through the gauge housing and are set for release at different times to control individual circuits. The circuits to be successively established by the springs may control any of the usual or desired operations of the cutting machine. When the machine is an internal grinder, the operations may be, for instance, the dressing of the grinding wheel or the slowing down of the traverse for finish grinding, a second dressing of the grinding wheel prior to finishing, and the retraction of the wheel to a remote position where the machine is stopped.

Figure 7:
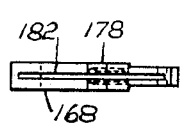
Fig. 7 is a plan view of a detail.

Each spring 164 is held under tension by a hooked catch 168 which is pivoted at 170 in a notch 172 on a rearward projection 174 of the casting 146, all of the catches being pressed down to latching position by a plate having a series of spring tongues 176, each engaging a catch. Each hooked catch has a tapped enlargement 178 which tightly receives an adjusting screw 180, the enlargement and the body of the catch having a central kerf or saw cut 182 (see Fig. 7) which makes the divided parts of the lever springy to frictionally engage the screw. The screws are accessible for adjustment through openings 184 in the casting 146, all the openings being covered normally by a thin plate 186. The end of each screw has a cone point arranged to abut against a ridge 188 on the multiplying lever 74 for sensitive adjustment. As the multiplying lever rises and after any existing lost motion between it and the adjusting screws is taken up, the hooked catches 168 are slowly raised and release the contact carrying springs, the cone pointed screws being adjusted to release the springs at different times. As soon as a spring is released, it moves immediately to circuit closing position and there is no sparking or pitting of contacts.

In setting the gauge, a master or reference work-piece of known size may be placed on the wheels and over the diamond points in the grinding position and the indicator dial set to read zero. One of the cone pointed screws can then be set to release its spring at this finished position of the multiplying lever 74 and the circuit completed will operate, for instance, the stopping of the machine. Another of the screws can be set to release its spring, say, when the piece to be ground is a thousandth of an inch from finished size, and the closing of this circuit will control, for instance, the second wheel dressing operation 10. The remaining screw can be set to release its spring at any desired size of the piece and this circuit will control, for instance, the first dressing operation on the wheel. The cone screws can be set once for all with respect to each other and then when the work changes or slight wear occurs in gauge parts, the apparatus can be easily set anew to very fine limits of size merely by adjusting the eccentric fulcrum pin by its graduated dial, the eccentric pin of course altering the position of the multiplying lever and its ridges with respect to all the cone pointed screws and the gauge stem. This is a much more delicate adjustment than can be secured by moving the gauge housing by means of the vertical screw 50.

To relatch the contact carrying springs in open circuit position, the following mechanism is provided. A headed stud 194 is rivetted to each spring and projects rearwardly through a fork in the upper arm of a lever 196 pivoted between lugs 198 on the rear of the casting 146. Each lever 196 has a rearwardly extending arm 200 arranged in the path of a horizontal rod 202 on the vertical slide bar 70. When the cam 96 is turned to depress the slide bar 70, the rod 202 swings all three of the arms 200 downwardly and the springs are all pulled rearwardly, their upper ends engaging the bevelled ends of the hooked latches and lifting the latter as the springs snap into latched position.

I claim:

1. In a device of the character described, a gauge carrier, a feeler arm secured to the carrier for supporting the carrier in a floating manner by continuous contact with the work surface to be sized, a second feeler arm mounted on the carrier and movable with respect to the first arm as the work changes in size, a lever fulcrumed on the carrier and controlled by the movable arm, and means for varying the fulcrum of the lever to set the movable arm in accurately adjusted position; substantially as described.

2. In a device of the character described, a gauge carrier, a feeler arm secured to the carrier for supporting the carrier in a floating manner by continuous contact with the work surface to be sized, a second feeler arm mounted on the carrier and movable with respect to the first arm as the work changes in size, a lever controlled by the movable arm, an eccentric fulcrum pin for the lever, and means for turning the eccentric fulcrum pin; substantially as described.

3. In a device of the character described, a gauge carrier, a feeler arm secured to the carrier for supporting the carrier in a floating manner by continuous contact with the work surface to be sized, a second feeler arm mounted on the carrier and movable with respect to the first cam as the work changes in size, and a cam for moving said second arm to change its distance from the first arm; substantially as described.

4. In a device of the character described, a gauge carrier, a feeler arm secured to the carrier for supporting the carrier in a floating manner by continuous contact with the work to be sized, a second feeler arm movable with respect to the carrier and engaging the work to be sized, a spring actuated member, and means controlled by the movement of the second feeler arm for releasing the spring actuated member at a predetermined size of the work; substantially as described.

5. In a device of the character described, a gauge carrier, a feeler arm secured to the carrier for supporting the carrier in a floating manner by continuous contact with the work surface to be sized, a second feeler arm movable with respect to the carrier and engaging the work to be sized, a member movably mounted on the carrier, a latch to hold the member in inoperative position, and a member controlled by the second feeler arm and having an adjustable contact with the latch; substantially as described.

6. In a device of the character described, a gauge carrier, a feeler arm secured to the carrier for supporting the carrier in a floating manner by continuous contact with the work surface to be sized, a second feeler arm movable with respect to the carrier and engaging the work to be sized, a member movably mounted on the carrier, a latch to hold the member in inoperative position, a multiplying lever controlled by the feeler arm, and an adjusting screw carried by the latch and engaging the lever; substantially as described.

7. In a device of the character described, a gauge carrier comprising a housing and a bracket, a feeler arm projecting laterally from the bracket and adapted to enter the bore of a hollow work-piece and support the weight of the carrier from said work-piece, an arm connected to the bracket and having a rocking mounting to allow the gauge carrier to float while supported by the feeler arm, a second feeler arm projecting laterally from the housing to engage an opposite point in the bore of the work-piece, a slide bar connected to the second feeler arm and movably mounted in the housing, and means controlled by the movement of the slide bar for continuously measuring the internal 8. In a device of the character described, a floating gauge for continuously indicating the internal diameter of a hollow work-piece during machining, comprising a gauge housing, a supporting feeler member having a rigid connection with the gauge housing and entering the bore of the work-piece, the feeler member being adapted for resting on the inner wall of the work-piece and supporting the weight of the gauge therefrom, a second feeler member riding on another point of the work-piece and movable with respect to the supporting feeler member as the piece changes in size, the gauge housing having a guideway, and a member guided in the housing guideway and actuated by the second feeler member; substantially as described.

9. In a device of the character described, a bracket, a gauge housing secured to the bracket, a feeler arm secured to the bracket for riding on the inner wall of a hollow work-piece during machining, means for rockably supporting the bracket whereby its weight and that of the housing are adapted for support by engagement of the feeler arm with the work-piece, a second feeler arm riding on another point of the work-piece and movable with respect to the first arm as the piece changes in size, and a bar slidable in the gauge housing and carrying the second arm; substantially as described.

10. In a device of the character described, a gauge carrier, a supporting feeler arm having a rigid connection with the carrier and adapted to support the carrier by resting on a round work-piece, a second feeler arm movably mounted on the carrier for engagement with an opposite point of the work-piece, the carrier having an arm provided with a freely rocking support, means for adjusting the gauge carrier bodily with respect to the rocking support, and means for adjusting the distance of the second feeler arm from the supporting feeler arm; substantially as described.

11. In a device of the character described, a supporting bracket, a feeler arm secured to the bracket for engaging a round work-piece, a gauge housing carried by the bracket, an arm secured to the bracket and movably mounted to allow the gauge housing to float while supported by the feeler arm, a second feeler arm projecting from the housing for engagement with an opposite point of the work-piece, and means for adjusting the gauge housing on the bracket to space the feeler arms in accordance with the size of the work-piece; substantially as described.

12. In a device of the character described, a supporting bracket, a feeler arm secured to the bracket for engaging a round work-piece, a gauge housing carried by the bracket, a second feeler arm projecting from the housing for engagement with an opposite point of the work-piece, means for adjusting the gauge housing on the bracket to space the feeler arms in accordance with the size of the work-piece, and means for effecting a fine adjustment of one of the arms with respect to the other; substantially as described.

13. In a device of the character described, in combination, means for supporting and rotating a round work-piece, a floating gauge comprising a supporting member adapted for riding on the work-piece and supporting the weight of the gauge thereon, a gauge housing carried by the supporting member, a gauge member to ride on a substantially opposite point of the work-piece and movable with respect to the gauge housing, and a control member actuated by the movement of the gauge member as the work-piece changes in size; substantially as described.

14. In a device of the character described, in combination, means for supporting and rotating a round work-piece, a floating gauge comprising a supporting member adapted for riding on the work-piece and supporting the weight of the gauge thereon, a gauge housing carried by the supporting member, a gauge member to ride on a substantially opposite point of the work-piece, a spring for causing said gauge member to move with respect to the housing as the piece changes in size, and a control member actuated by the movement of the gauge member; substantially as described.

15. In a device of the character described, in combination, means for supporting and rotating a round work-piece, a floating gauge comprising a supporting member adapted for riding on the work-piece and supporting the weight of the gauge thereon, a gauge housing carried by and floating with the supporting member, means for adjustably securing the gauge housing to the supporting member, a gauge member to ride on a substantially opposite point of the work-piece and movable with respect to the housing, and a control lever actuated by the gauge member; substantially as described.

16. In a device of the character described, in combination, means for supporting and rotating a round work-piece, a floating gauge comprising a supporting member adapted for riding on the work-piece and supporting the weight of the gauge thereon, a gauge housing carried by the supporting member, a gauge member to ride on a substantially opposite point of the work-piece and movable with respect to the housing, a control member actuated by the gauge member, a spring for moving the gauge member in one direction, and a cam for moving the gauge member in the opposite direction; substantially as described.

17. In a device of the character described, a gauge carrier, a feeler arm movable with respect to the carrier and engaging a work-piece to be sized, a spring, a latch for holding the spring under tension, a member actuated by the movement of the feeler arm for releasing the latch at a predetermined size of the work, and means operated by a movement of the feeler arm for resetting the spring in latched position; substantially as described.

18. In a device of the character described, a gauge carrier, a supporting feeler arm having a rigid connection with the carrier and adapted to support the carrier by resting on a round work-piece, a second feeler arm movably mounted on the carrier for engagement with an opposite point of the work-piece, a rock shaft, an arm for securing the carrier to the rock shaft, and means for varying the effective length of the arm; substantially as described.

19. In a device of the character described, a gauge carrier, a series of spring tensioned controlling devices on the carrier, a series of latches for holding the controlling devices in inoperative position, a feeler arm for controlling the actuation of the latches, a series of levers having operative connections with the controlling devices, and means for operating the series of levers to reset the controlling devices in latched position; substantially as described.

20. In a device of the character described, a gauge carrier, a series of spring tensioned controlling devices on the carrier, a series of latches for holding the controlling devices in inoperative position, a feeler arm for controlling the actuation of the latches, a series of levers having operative connections with the controlling devices, a rod movable into engagement with the levers, and means for actuating the rod to reset the controlling devices in latched position; substantially as described.

21. In a device of the character described, a gauge carrier, a series of spring tensioned controlling devices on the carrier, a series of latches for holding said controlling devices in inoperative position, a feeler arm movable with respect to the carrier and adapted to engage the work to be sized, means operated by the feeler arm for actuating the latches to release the controlling devices; substantially as described, and means adjustable with respect to the latches for making release of the controlling devices occur in sequence.

22. In a device of the character described, a gauge carrier, a series of spring tensioned controlling devices on the carrier, a series of latches for holding said controlling devices in inoperative position, an adjusting screw carried by each latch, a lever engaging the adjusting screws, a feeler arm movable with respect to the carrier and adapted to engage the work to be sized, and means for moving the lever with the feeler arm to actuate the latches to successively release the controlling devices; substantially as described.

23. In a device of the character described, a gauge carrier, a series of spring tensioned controlling devices on the carrier, a series of latches for holding the controlling devices in inoperative position, a feeler arm movable with respect to the carrier and adapted to engage the work to be sized, means operated by the feeler arm for actuating the latches to release the controlling devices, means for making the release of the controlling devices occur in sequence, and means for resetting the controlling devices in inoperative position; substantially as described.

24. In a device of the character described, a gauge carrier, a series of spring tensioned controlling devices on the carrier, a series of independently movable latches for holding said controlling devices in inoperative position, a lever engaging all of the latches for moving the latches successively to releasing position, a feeler arm movable with respect to the carrier and adapted to engage the work to be sized, and means for moving the lever with the feeler arm; substantially as described.

25. In a device of the character described, a gauge carrier, a series of spring tensioned controlling devices on the carrier, a series of latches for holding said controlling devices in inoperative position, a lever for moving the series of latches, a feeler arm movable with respect to the carrier and adapted to engage the work to be sized, means for moving the lever with the feeler arm to release the controlling devices, and means for causing the release of said devices to occur in predetermined sequence; substantially as described.

26. In a device of the character described, a gauge carrier, a series of spring tensioned controlling devices on the carrier, a series of latches for holding said controlling devices in inoperative position, a lever fulcrumed on the carrier for moving the series of latches, means for effecting different operative relations between the latches and the lever, a feeler arm movable with respect to the carrier and adapted to engage the work to be sized, means for moving the lever with the feeler arm to successively release the controlling devices, and means for adjusting the fulcrum of the lever to vary the time of said releases without affecting the interval between them; substantially as described.

27. In a device of the character described, a gauge carrier, a feeler arm movably mounted on the carrier and adapted to engage a work surface, a lever fulcrumed on the carrier, means for actuating the lever from the feeler arm, a control member actuated by the lever, and means for changing the position of the fulcrum of the lever; substantially as described.

28. In a device of the character described, a gauge carrier, a feeler arm movably mounted on the carrier and adapted to engage a work-piece, a lever fulcrumed on the carrier, means for actuating the lever from the feeler arm, a plurality of control members adapted for actuation by the lever, and the fulcrum of the lever comprising an eccentric for adjusting the lever with respect to said control members; substantially as described.

29. In a device of the character described, a gauge carrier, a bar slidably mounted on the carrier, a feeler arm connected to the bar and adapted to engage a work surface, a lever fulcrumed on the carrier and having engagement with the slidable bar, a control member actuated by the lever, and means for moving the fulcrum of the lever; substantially as described.

PHILIP H. HUTCHINSON.

CERTIFICATE OF CORRECTION.

Patent No. 1,922,093.                                              August 15, 1933.

PHILIP H. HUTCHINSON.

It is hereby certified that error appears in the printed specification of the above numbered patent requiring correction as follows: Page 1, line 66, for "fo" read of; page 3, line 98, claim 3, for "cam" read arm; page 5, lines 19 and 20, claim 21, strike out the semi-colon and words "; substantially as described,", and line 22, after "sequence" insert the words substantially as described; and that the said Letters Patent should be read with these corrections therein that the same may conform to the record of the case in the Patent Office.

Signed and sealed this 21st day of November, A. D. 1933.

F. M. Hopkins (Seal)                                             Acting Commissioner of Patents.